US012807899B2

(12) United States Patent
Neubauer et al.

(10) Patent No.: US 12,807,899 B2
(45) Date of Patent: Nov. 24, 2026

(54) COLOR-PROTECTING DETERGENTS

(71) Applicant: Henkel AG & Co. KGaA, Duesseldorf (DE)

(72) Inventors: Kira Neubauer, Wuppertal (DE); Christian Kropf, Hilden (DE); Janice Mahnke, Wuppertal (DE); Laura Falenski, Neuss (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 223 days.

(21) Appl. No.: 18/763,060

(22) Filed: Jul. 3, 2024

(65) Prior Publication Data

US 2024/0360383 A1 Oct. 31, 2024

Related U.S. Application Data

(63) Continuation of application No. PCT/EP2022/084889, filed on Dec. 8, 2022.

(30) Foreign Application Priority Data

Jan. 6, 2022 (DE) ......................... 102022200095.1

(51) Int. Cl.
*C11D 3/00* (2006.01)
*C11D 3/37* (2006.01)

(52) U.S. Cl.
CPC .......... *C11D 3/0021* (2013.01); *C11D 3/3715* (2013.01); *C11D 2111/12* (2024.01)

(58) Field of Classification Search
None
See application file for complete search history.

(56) References Cited

U.S. PATENT DOCUMENTS

| | | | | |
|---|---|---|---|---|
| 9,458,299 | B1 | 10/2016 | Boday et al. | |
| 2012/0189562 | A1* | 7/2012 | Dimotakis ............... | A61K 8/85 424/59 |
| 2015/0203795 | A1 | 7/2015 | Miracle et al. | |
| 2016/0090438 | A1* | 3/2016 | Sworen ................ | C08G 18/345 528/57 |
| 2016/0090560 | A1* | 3/2016 | Sworen .................... | C11D 3/32 510/516 |
| 2026/0159644 | A1* | 6/2026 | Wolf .................... | C08G 63/676 |

FOREIGN PATENT DOCUMENTS

| | | | | |
|---|---|---|---|---|
| CA | 2161744 A1 * | 5/1996 | ............. | C08G 63/91 |
| WO | 2007019981 A1 | 2/2007 | | |
| WO | 2008110469 A1 | 9/2008 | | |
| WO | 2009153184 A1 | 12/2009 | | |

OTHER PUBLICATIONS

Darcos et al., "Cationic polyesters bearing pendent amino groups prepared by thiol-ene chemistry," Polymer Chemistry, vol. 3, pp. 362-368, 2012.*

D. M. Lynn, D. G. Anderson, D. Putnam, R. Lange, Accelerated Discovery of Synthetic Transfection Vectors: Parallel Synthesis and Screening of a Degradable Polymer Library, J. Am. Chem. Soc. 2001, vol. 123, Jul. 27, 2001, No. 33, S. 8155-8156.

A. K. Sinha, D. Equbal, Thiol-Ene Reaction: Synthetic Aspects and Mechanistic Studies of an Anti-Markovnikov-Selective Hydrothiolation of Olefins, Asian J. Org. Chem. 2019, 8, 32 -47, Wiley-VCH Verlag Gmbh & Co. KGaA, Weinheim.

S. P. S. Koo, M. M. Stamenovic, R. A. Prasath, A. J. Inglis, F. E. Du Prez, C. Barner-Kowollik, W. Van Camp, T. Junkers, Limitations of Radical Thiol-ene Reactions for Polymer-Polymer Conjugation, Journal of Polymer Science: Part A: Polymer Chemistry, vol. 48, 1699-1713 (2010), Wiley Periodicals, Inc.

Sananda Chanda, S. Ramakrishnan, Poly(alkylene itaconate)s—an interesting class of polyesters with periodically located exo-chain double bonds susceptible to Michael addition, Polymer Chemistry 2015, 6, 2108-2114, The Royal Society of Chemistry.

Saskia J. Boardman, Adam S. Hayward, Neil J. Lant, Renae D. Fossum, Paul D. Thornton, Polymers for dye transfer Inhibition in laundry applications, J. Appl Polym Sci. 2021, Bd. 138: Nr. 1, Jul. 9, 2020, e49632.

D. M. Lynn, R. Langer, Degradable Poly(ß-amino esters): Synthesis, Characterization, and Self-Assembly with Plasmid DNA, J. Am. Chem. Soc. 2000, 122, 10761-10768, American Chemical Society.

V. V. Filipovic, B. D. Nedeljkovic, M. Vukomanivic, S. LJ. Tomic, Biocompatible and degradable scaffolds based on 2-hydroxyethyl methacrylate, gelatin and poly(beta amino ester) crosslinkers, Polymer Testing 68 (2018) Apr. 17, 2018, pp. 270-278, XP085405512, ISSN: 0142-9418, Elsevier Ltd., Amsterdam.

T. J. Farmer, J. H. Clark, D. J. Macquarrie, J. K. Ogunjobi, R.L. Castle, Post-polymerisation modification of bio-derived unsaturated polyester resins via Michael additionsof 1,3-dicarbonyls, Polym. Chem., 2016, 7, 1650-1658, The Royal Society of Chemistry.

Alice Guarneri, Viola Cutifani, Marco Cespugli, Alessandro Pellis, Roberta Vassallo, Fioretta Asaro, Cynthia Ebert, Lucia Gardossi, Functionalization of Enzymatically Synthesized Rigid Poly (itaconate)s via Post-Polymerization Aza-Michael Addition of Primary Amines, Adv. Synthesis & Catalysis, Apr. 12, 2019, 361, 2559-2573, Wiley-VCH Verlag Gmbh & Co. KGaA, Weinheim.

J. Chen, S.-W. Huang, M. Liu, R.-X. Zhuo, Synthesis and degradation of poly(beta-aminoester) with pendant primary amine, Polymer 48, Jan. 8, 2007, 675-681.

Gert J. Noordzij, Carolus H. R. M. Wilsens, Cascade aza-Michael Addition-Cyclizations; Toward Renewable and Multifunctional Carboxylic Acids for Melt-Polycondensation, Frontiers in Chemistry, Nov. 14, 2019, pp. 1-14, vol. 7, Article 729, Frontiers in Chemistry.

(Continued)

*Primary Examiner* — Lorna M Douyon
(74) *Attorney, Agent, or Firm* — Bojuan Deng

(57) ABSTRACT

Polyester-based comb polymers obtainable by aza-Michael addition of primary monoamines or primary or secondary diamines on diesters from unsaturated monocarboxylic acids and diols, are included in surfactant-containing aqueous detergent solutions in order to prevent the transfer of textile dyes from colored textiles to uncolored textiles or textiles of other colors when washing textiles together in the detergent solutions.

6 Claims, No Drawings

(56) References Cited

OTHER PUBLICATIONS

Y. Li, Y. Zhang, Q. Li, H. Li, S. Zheng, Y. Hu, Synthesis of Novel Chain-End-Functionalized Polyethylenes via Thiol-ene Click Chemistry, Macromolecular Chemistry and Physics, 2015, 216, 569-581, Wiley-VCH Verlag GmbH & Co. KGaA, Weinheim.

German Patent and Trademark Office, Research Report, DE 102022200095.1, Mailing date: Sep. 7, 2022, pp. 1-6, Munich.

PCT International Research Report, PCT/EP2022/084889, 2023-03-09, pp. 1-14, Rijswijk, Netherlands.

* cited by examiner

COLOR-PROTECTING DETERGENTS

FIELD OF THE INVENTION

The present invention relates to the use of specific polyester-based comb polymers as dye-transfer-inhibiting active ingredients when washing textiles and to detergents which contain such active ingredients.

BACKGROUND OF THE INVENTION

In addition to the ingredients such as surfactants and builder materials that are essential to the washing process, detergents generally contain further constituents which can be referred to collectively by the term washing auxiliaries and comprise the very different active ingredient groups such as foam regulators, graying inhibitors, bleaching agents, bleach activators and enzymes. Such auxiliaries also include substances which are intended to prevent colored textiles from causing a changed color impression after washing. This change in color impression of washed, i.e., cleaner, textiles can be based on the fact that dye proportions are removed from the textile by the washing process ("fading"), but it is also possible that dyes separated from textiles of other colors can be deposited on the textile ("discoloration"). The discoloration aspect can also play a role in uncolored items of laundry if they are washed together with colored items of laundry. In order to avoid these undesired side effects of removing dirt from textiles by treatment with usually surfactant-containing aqueous systems, detergents contain, in particular if they are provided as "colored detergents" for washing colored textiles, active ingredients which prevent the separation of dyes from the textile or which are at least intended to prevent separated dyes located in the washing liquor from being deposited on textiles. Many of the polymers commonly used have such a high affinity for dyes that they increasingly draw them from the dyed fiber, which results in increased color loss.

Known dye transfer inhibitors are, for example, polymers of vinylpyrrolidone, vinylimidazole, vinylpyridine N-oxide and copolymers thereof. The dye-transfer-inhibiting properties of specific triazine derivatives are known from international patent applications WO 2008/110469 A1 and WO 2007/019981 A1.

Surprisingly, it has been found that aza-Michael addition products of S-substituted primary aminothiols to oligoesters of unsaturated dicarboxylic acids and diols in the washing process have a positive effect on the color transfer and prevent coloration of uncolored textiles.

D. M. Lynn, R. Langer, J. Am. Chem. Soc. 2000, 122, 10761-10768; D. M. Lynn, D. G. Anderson, D. Putnam, R. Langer, J. Am. Chem. Soc. 2001, 123, 8155-8156; J. Shen, S.-W. Huang, M. Liu, R.-X. Zhou, Polymer 48 (2007) 675-681; V. V. Filipovic, B. D. Nedeljcovic, M. Vuomananivic, S. Lj. Tomic, Polymer Testing 68 (2018) 270-278; and specification U.S. Pat. No. 9,458,299 B1 disclose aza-Michael addition. The application thereof to unsaturated dicarboxylic acids is described in G. J. Noodzj, C. H. R. M. Wilsens, Frontiers in Chemistry, November 2019, Volume 7, Article 729. Michael additions to polyesters of unsaturated polycarboxylic acids are described in T. J. Farmer, J. H. Clark, D. J. Macquarrie, J. K. Ogunjobi, R. L. Castle, Polym. Chem., 2016, 7, 1650-1658.

BRIEF SUMMARY OF THE INVENTION

The invention relates to the use of polyester-based comb polymers, obtainable by aza-Michael addition of S-substituted primary aminothiols to oligoesters of mono- or diethylenically unsaturated dicarboxylic acids and diols, in order to prevent the transfer of textile dyes from colored textiles to uncolored textiles or textiles of other colors when washed together in aqueous solutions, in particular surfactant-containing aqueous solutions.

DETAILED DESCRIPTION OF THE INVENTION

The S-substituted primary aminothiols selected are, in particular, those of the general formula,

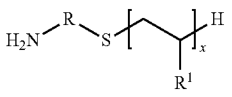

in which R represents a straight-chain or branched hydrocarbon group having 2 to 12 C atoms or $-(CR^3R^4-CR^3R^4-O)_y-CR^3R^4-CR^3R^4-$, in which $R^3$ and $R^4$ represent, independently of one another, H or a $C_1$-$C_3$ alkyl group, $R^1$ represents a heterocycle, in particular an N-containing heterocycle, y represents a number from 1 to 12, in particular a number from 1 to 4, and x represents a number from 0 to 30, in particular a number from 5 to 20, wherein y and x can also have non-integer values. $R^1$ is preferably a pyrrolidone, imidazole or pyridine N-oxide group. Such compounds can, as is generally known from S. P. S. Koo, M. M. Stamenovic, R. A. Prasath, A. J. Inglis, F. E. du Prez, C. Barner-Kowollik, W. van Kamp, T. Junkers, Journal of Polymer Science: Part A: Polymer Chemistry, 48, 2010, pages 1690-1713; A. K. Sinha, D. Equbal, Asian J. Org. Chem. 2019, 8, 32-47; and Y. Li, Y. Zhang, Q. Li, H. Li, S. Zheng, Y. Hu, Macromol. Chem. Phys. 2015, 216, 569-581, be produced by radical addition of compounds $H_2N-R-SH$ to compounds $R^1-CH=CH_2$, where the latter can oligomerize or polymerize and compounds of the given formula whereby x is greater than 1 are formed.

In the unsaturated dicarboxylic acids, the double bonds can be present in E or Z configuration. Preferred mono- or diethylenically unsaturated dicarboxylic acids are maleic acid, fumaric acid, itaconic acid, mesaconic acid, citraconic acid, mucic acid, and mixtures thereof. Monoethylenically unsaturated dicarboxylic acids are preferably used.

Preferred diols are selected from those of the general formula HO—CHR'-A-CHR'—OH, in which A represents $-(CR^1R^2)_m-$ or $-((CR^5R^6)_p-O-(CR^5R^6)_q)_n-$, in which $R^1$ and $R^2$ represent, independently of one another, H or a $C_1$-$C_{12}$ alkyl group, $R^5$ and $R^6$ represent H or a $C_1$-$C_3$ alkyl group, R' represents H or a methyl group, m represents a number from 0 to 10, n represents a number from 0 to 30 and p and q represent, independently of one another, numbers from 1 to 3, wherein m, n, p and q can also have non-integer values when diol mixtures are used. $R^1$ and/or $R^2$ and/or $R^5$ and/or $R^6$ is/are preferably H or an alkyl group having 1 to 3 C atoms. R' is preferably H. Preferably, m is a number in the range from 1 to 4 and/or n is a number in the range from 2 to 4.

The aforementioned dicarboxylic acids and the aforementioned diols can be esterified with one another by known methods, in which equimolar amounts of dicarboxylic acid and diol are preferably used, such that the resulting oligoester has on average the same number of carboxylic acid end groups as hydroxyl end groups. However, it is also possible to use more than equimolar amounts of dicarboxylic acid or of diol, such that the average proportion of the carboxylic acid end groups or of the hydroxyl end groups in the resulting oligoester is increased and in extreme cases is 100%. The degree of oligomerization z in the oligoesters is preferably in the range from 1 to 30, particularly preferably from 2 to 30, and even more preferably from 5 to 15 and can also assume non-integer values as a variable to be analytically determined.

The above-mentioned S-substituted primary aminothiols can be added to the esters in accordance with the above-cited regulations known from the literature, or on the basis thereof. When itaconic acid ($R^2$=$CH_2$) or maleic acid ($R^2$=direct bond) is used, polyester-based comb polymers of the formula

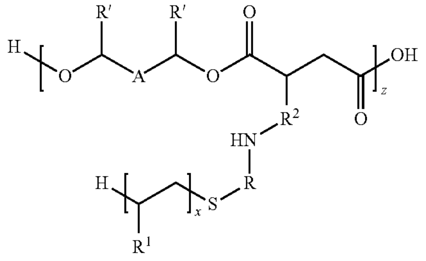

are obtained, in which R, $R^1$, R', A, x and z have the meanings given above. With the simultaneous use of different S-substituted primary aminothiols, for example aminoalkylpyrrolidone and aminoalkylimidazole compounds, in the 1,4 addition, target compounds can be obtained in which the substitution units, for example the aminoalkylpyrrolidone and the aminoalkylimidazole groups, are present in statistical distribution.

In both aspects addressed above, the active ingredients that can thus be obtained contribute to the color consistency, i.e., they reduce both the discoloration and the fading, although the effect of preventing coloration, in particular when washing white textiles, is most marked. The invention therefore also relates to the use of active ingredients that can be obtained in this way to prevent the color impression of colored textiles changing, preferably those consisting of or containing cotton, when washed in, in particular surfactant-containing, aqueous solutions. The change in color impression is not to be understood as meaning the difference between the soiled and clean textile, but the difference between each clean textile before and after the washing process. The invention therefore further relates to a detergent containing surfactant and other conventional ingredients of detergents and a polyester-based comb polymer as defined above in the dye-transfer-inhibiting amount. A dye-transfer-inhibiting amount should be understood to mean an amount which significantly reduces the transfer of dyes from colored textiles to uncolored textiles or textiles of other colors when washed together, in comparison with otherwise identical conditions in the absence of the active ingredient. The aforementioned dye-transfer-inhibiting active ingredients are preferably used in detergents in amounts of from 0.01 wt. % to 5 wt. %, in particular from 0.05 wt. % to 1 wt. %.

The invention further relates to a method for washing white or colored textiles in surfactant-containing aqueous solutions in the presence of textiles of other colors, the method being characterized in that a surfactant-containing aqueous liquor is used which contains a polyester-based comb polymer as defined above. In such a method, it is possible to wash white or uncolored textiles together with the colored textile without the white or uncolored textile becoming colored. Preferably, 0.0003 g/l to 0.16 g/l, in particular 0.0015 g/l to 0.03 g/l of the polyester-based comb polymer defined above is used in the aqueous liquor.

In addition to the aforementioned dye transfer inhibitor, a detergent can contain conventional ingredients compatible with this constituent. For instance, the detergent can thus additionally contain another dye transfer inhibitor, preferably in amounts of 0.1 wt. % to 2 wt. %, in particular 0.2 wt. % to 1 wt. %, which, in a preferred embodiment, is selected from the polymers of vinylpyrrolidone, vinylimidazole, vinylpyridine-N-oxide, or the copolymers thereof. It is possible to use polyvinylpyrrolidones having molecular weights of from 15,000 to 50,000 as well as polyvinylpyrrolidones having higher molecular weights of, for example, up to more than 1,000,000, in particular from 1,500,000 to 4,000,000, N-vinylimidazole/N-vinylpyrrolidone copolymers, polyvinyloxazolidones, copolymers based on vinyl monomers and carboxylic acid amides, pyrrolidone-group-containing polyesters and polyamides, grafted polyamidoamines and polyethyleneimines, polyamine-N-oxide polymers, polyvinyl alcohols and copolymers based on acrylamido alkenyl sulfonic acids. However, it is also possible to use enzymatic systems comprising a peroxidase and hydrogen peroxide or a substance which produces hydrogen peroxide in water. The addition of a mediator compound for the peroxidase, for example an acetosyringone, a phenol derivative or a phenotiazine or phenoxazine, is preferred in this case, it also being possible to additionally use above-mentioned polymeric dye transfer inhibitor active ingredients. Polyvinylpyrrolidone preferably has an average (weight average) molar mass in the range from 10,000 to 60,000, in particular in the range from 25,000 to 50,000, for use in agents according to the invention. Of the copolymers, those consisting of vinylpyrrolidone and vinylimidazole in a molar ratio of 5:1 to 1:1 with an average (weight average) molar mass in the range of from 5,000 to 50,000, in particular 10,000 to 20,000, are preferred.

Detergents which may be in the form of in particular powdered solids, in further-compacted particulate form, homogeneous solutions, or suspensions, may in principle contain, in addition to the active ingredient used according to the invention, any known ingredients that are conventional in such agents of this kind. The agents according to the invention can, in particular, comprise builder substances, surface-active surfactants, bleaching agents based on organic and/or inorganic peroxygen compounds, bleach activators, water-miscible organic solvents, enzymes, sequestering agents, electrolytes, pH regulators, and further auxiliaries, such as optical brighteners, graying inhibitors and foam regulators, as well as dyes and fragrances.

The agents can contain one or more surfactants, with anionic surfactants, non-ionic surfactants and mixtures thereof being particularly suitable, but cationic, zwitterionic and/or amphoteric surfactants also being suitable.

Suitable non-ionic surfactants are in particular alkyl glycosides and ethoxylation and/or propoxylation products of alkyl glycosides or linear or branched alcohols each having 12 to 18 C atoms in the alkyl portion and 3 to 20, preferably 4 to 10, alkyl ether groups. Corresponding ethoxylation and/or propoxylation products of N-alkyl amines, vicinal diols, fatty acid esters and fatty acid amides which, with regard to the alkyl portion, correspond to the long-chain alcohol derivatives mentioned, and of alkyl phenols having 5 to 12 C atoms in the alkyl functional group can also be used.

Nonionic surfactants that are preferably used are alkoxylated, preferably ethoxylated, in particular primary alcohols with preferably 8 to 18 C atoms and, on average, 1 to 12 mol of ethylene oxide (EO) per mol of alcohol, in which the alcohol residue can be linear or preferably methyl-branched in the 2 position, or it can contain linear and methyl-branched residues in admixture, as are usually present in oxo-alcohol residues. However, alcohol ethoxylates having linear functional groups of alcohols of native origin having 12 to 18 C atoms, for example of coconut, palm, tallow fatty or oleyl alcohol, and an average of 2 to 8 EO per mol of alcohol, are particularly preferred. Preferred ethoxylated alcohols include, for example, $C_{12}$-$C_{14}$ alcohols having 3 EO or 4 EO, $C_9$-$C_{11}$ alcohols having 7 EO, $C_{13}$-$C_{15}$ alcohols having 3 EO, 5 EO, 7 EO or 8 EO, $C_{12}$-$C_{18}$ alcohols having 3 EO, 5 EO or 7 EO and mixtures thereof, such as mixtures of $C_{12}$-$C_{14}$ alcohol having 3 EO and $C_{12}$-$C_{18}$ alcohol having 7 EO. The degrees of ethoxylation specified represent statistical averages that can correspond to an integer or a fractional number for a specific product. Preferred alcohol ethoxylates have a narrowed homolog distribution (narrow range ethoxylates, NRE). In addition to these non-ionic surfactants, fatty alcohols having more than 12 EO can also be used. Examples of these are (tallow) fatty alcohols having 14 EO, 16 EO, 20 EO, 25 EO, 30 EO or 40 EO. It is conventional to use extremely low-foaming compounds in particular in agents for use in machine processes. These preferably include $C_{12}$-$C_{18}$ alkyl polyethylene glycol polypropylene glycol ethers each having up to 8 mol of ethylene oxide and propylene oxide units in the molecule. However, other known low-foam non-ionic surfactants can also be used, such as $C_{12}$-$C_{18}$ alkyl polyethylene glycol-polybutylene glycol ethers each having up to 8 mol of ethylene oxide and butylene oxide units in the molecule and end-capped alkylpolyalkylene glycol mixed ethers. The hydroxyl-group-containing alkoxylated alcohols, known as hydroxy mixed ethers, are also particularly preferred. Non-ionic surfactants also include alkyl glycosides of general formula RO(G)x be used, in which R means a primary straight-chain or methyl-branched aliphatic group, in particular an aliphatic group that is methyl-branched in the 2nd position and has 8 to 22, preferably 12 to 18, C atoms, and G represents a glycose unit having 5 or 6 C atoms, preferably glucose. The degree of oligomerization x, which indicates the distribution of monoglycosides and oligoglycosides, is any number—which can also assume fractional values as a variable to be analytically determined—between 1 and 10; x is preferably between 1.2 and 1.4. Likewise suitable are polyhydroxy fatty acid amides of formula IV, in which $R^1CO$ represents an aliphatic acyl group having 6 to 22 carbon atoms, $R^2$ represents hydrogen, an alkyl or hydroxy alkyl group having 1 to 4 carbon atoms and [Z] represents a linear or branched polyhydroxy alkyl group having 3 to 10 carbon atoms and 3 to 10 hydroxyl groups:

(IV)

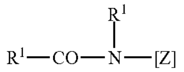

Polyhydroxy fatty acid amides are preferably derived from reducing sugars, in particular glucose, having 5 or 6 carbon atoms. The group of polyhydroxy fatty acid amides also includes compounds of formula (IV), (V)

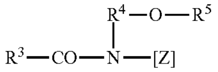

in which $R^3$ represents a linear or branched alkyl or alkenyl group having 7 to 12 carbon atoms, $R^4$ represents a linear, branched or cyclic alkylene group or an arylene group having 2 to 8 carbon atoms, and $R^5$ represents a linear, branched or cyclic alkyl group or an aryl group or an oxy alkyl group having 1 to 8 carbon atoms, where $C_1$-$C_4$ alkyl or phenyl groups are preferred, and [Z] represents a linear polyhydroxy alkyl group, the alkyl chain of which is substituted with at least two hydroxyl groups, or alkoxylated, preferably ethoxylated or propoxylated, derivatives of this group. [Z] is also preferably obtained by reductive amination of a sugar, for example glucose, fructose, maltose, lactose, galactose, mannose, or xylose. The N-alkoxy- or N-aryloxy-substituted compounds can be converted into the desired polyhydroxy fatty acid amides by reaction with fatty acid methyl esters in the presence of an alkoxide as the catalyst. Another class of non-ionic surfactants that are preferably used, which are used either as the sole non-ionic surfactant or in combination with other non-ionic surfactants, in particular together with alkoxylated fatty alcohols and/or alkyl glycosides, is alkoxylated, preferably ethoxylated or ethoxylated and propoxylated fatty acid alkyl esters, preferably having 1 to 4 carbon atoms in the alkyl chain, in particular fatty acid methyl esters. Non-ionic surfactants of the aminoxide type, for example N-cocoalkyl-N,N-dimethylamine oxide, and N-tallow-alkyl-N,N-dihydroxyethylamine oxide, and of the fatty acid alkanolamides may also be suitable. The quantity of these non-ionic surfactants is preferably no more than that of the ethoxylated fatty alcohols, in particular no more than half thereof. Surfactants known as gemini surfactants can also be considered. These are generally understood to mean those compounds which have two hydrophilic groups per molecule. These groups are separated from one another by a "spacer." This spacer is generally a carbon chain that should be long enough that the hydrophilic groups are sufficiently spaced apart so that they can act independently of one another. Such surfactants are characterized by an unusually low critical micelle concentration and the ability to greatly reduce the surface tension of the water. In exceptional cases, the expression gemini surfactants is understood to mean not only "dimeric" but also "trimeric" surfactants. Suitable gemini surfactants are, for example, sulfated hydroxy mixed ethers or dimer alcohol bis- and trimer alcohol tris sulfates and ether sulfates. End-capped dimeric and trimeric mixed ethers are characterized in particular by their bi- and multifunctionality. The aforementioned end-capped surfactants thus have good wetting properties and are low-foaming, which means that they are particularly suitable for use in machine washing or cleaning processes. However, gemini polyhydroxy fatty acid amides or poly-polyhydroxy fatty acid amides can also be used.

Suitable anionic surfactants are, in particular, soaps and those which contain sulfate or sulfonate groups. Preferably, $C_9$-$C_{13}$ alkylbenzene sulfonates, olefin sulfonates, i.e., mixtures of alkene and hydroxyalkane sulfonates, and disulfonates, as obtained, for example, from $C_{12}$-$C_{18}$ monoolefins having a terminal or internal double bond by means of sulfonation with gaseous sulfur trioxide and subsequent alkaline or acid hydrolysis of the sulfonation products, are possible as surfactants of the sulfonate type. Alkane sulfonates obtained from $C_{12}$-$C_{18}$ alkanes, for example by means of sulfochlorination or sulfoxidation with subsequent hydrolysis or neutralization, are also suitable. The esters of α-sulfo fatty acids (ester sulfonates), for example the α-sulfonated methyl esters of hydrogenated coconut, palm kernel or tallow fatty acids, which are produced by α-sulfonation of the methyl esters of fatty acids of vegetable and/or animal origin having 8 to 20 C atoms in the fatty acid molecule and subsequent neutralization so as to produce water-soluble monosalts, are also considered to be suitable. Preferably, these are the α-sulfonated esters of hydrogenated coconut, palm, palm kernel or tallow fatty acids, it also being possible for sulfonation products of unsaturated fatty acids, for example oleic acid, to be present in small amounts, preferably in amounts of no more than approximately 2 to 3 wt. %. Particularly preferred are α-sulfo fatty acid alkyl esters which have an alkyl chain having no more than 4 C atoms in the ester group, for example methyl ester, ethyl ester, propyl ester, and butyl ester. Particularly advantageously, the methyl esters of α-sulfo fatty acids (MES), but also the saponified di-salts thereof, are used. Other suitable anionic surfactants are sulfonated fatty acid glycerol esters, which constitute monoesters, diesters and triesters and the mixtures thereof, as they are obtained during production by means of esterification by a monoglycerol with 1 to 3 mol of fatty acid or during the transesterification of triglycerides with 0.3 to 2 mol of glycerol. The alkali salts and in particular the sodium salts of the sulfuric acid half-esters of $C_{12}$-$C_{18}$ fatty alcohols, for example from coconut fatty alcohol, tallow fatty alcohol, lauryl alcohol, myristyl alcohol, cetyl alcohol or stearyl alcohol, or of $C_{10}$-$C_{20}$ oxo alcohols and the half-esters of secondary alcohols having this chain length, are preferred as alk(en)yl sulfates. Further preferred are alk(en)yl sulfates of the chain length mentioned, which contain a synthetic straight-chain alkyl residue produced on a petrochemical basis and which have a degradation behavior analogous to that of the adequate compounds based on fat chemical raw materials. From a washing perspective, $C_{12}$-$C_{16}$ alkyl sulfates, $C_{12}$-$C_{15}$ alkyl sulfates and $C_{14}$-$C_{15}$ alkyl sulfates are particularly preferred. The sulfuric acid monoesters of straight-chain or branched $C_7$-$C_{21}$ alcohols ethoxylated with 1 to 6 of mol ethylene oxide, such as 2-methyl-branched $C_9$-$C_{11}$ alcohols having, on average, 3.5 mol ethylene oxide (EO) or $C_{12}$-$C_{18}$ fatty alcohols having 1 to 4 EO, are also suitable. Preferred anionic surfactants also include the salts of alkyl sulfosuccinic acid, which are also referred to as sulfosuccinates or as sulfosuccinic acid esters and which represent monoesters and/or diesters of sulfosuccinic acid with alcohols, preferably fatty alcohols, and in particular ethoxylated fatty alcohols. Preferred sulfosuccinates contain $C_8$-$C_{18}$ fatty alcohol groups or mixtures thereof. Particularly preferred sulfosuccinates contain a fatty alcohol residue which is derived from ethoxylated fatty alcohols, which in themselves represent nonionic surfactants. Among these, in turn, sulfosuccinates, including fatty alcohol groups that derive from ethoxylated fatty alcohols exhibiting a restricted distribution of homologs, are particularly preferred. Likewise, it is also possible to use alk(en)yl succinic acid having preferably 8 to 18 carbon atoms in the alk(en)yl chain, or the salts thereof. Fatty acid derivatives of amino acids, for example of N-methyltaurine (taurides) and/or of N-methylglycine (sarcosides), are also considered as further anionic surfactants. The sarcosides or sarcosinates, and in this case especially sarcosinates of higher and optionally mono- or polyunsaturated fatty acids such as oleyl sarcosinate, are particularly preferred. Further anionic surfactants that can also be used are in particular soaps. In particular saturated fatty acid soaps are suitable, such as the salts of lauric acid, myristic acid, palmitic acid, stearic acid, hydrogenated erucic acid and behenic acid, and in particular soap mixtures derived from natural fatty acids, such as coconut fatty acids, palm kernel fatty acids or tallow fatty acids. The known alkenylsuccinic acid salts can also be used together with these soaps or as substitutes for soaps.

The anionic surfactants, including the soaps, can be present in the form of the sodium, potassium, or ammonium salts thereof, or as soluble salts of organic bases, such as mono-, di- or triethanolamine. The anionic surfactants are preferably present in the form of the sodium or potassium salts thereof, in particular in the form of the sodium salts. Surfactants are contained in detergents in proportions of normally 1 wt. % to 50 wt. %, in particular from 5 wt. % to 30 wt. %.

A detergent preferably contains at least one water-soluble and/or water-insoluble, organic and/or inorganic builder. The water-soluble organic builder substances include polycarboxylic acids, in particular citric acid and saccharic acids; monomer and polymer aminopolycarboxylic acids, in particular methylglycinediacetic acid, nitrilotriacetic acid, ethylenediaminetetraacetic acid and polyaspartic acid; polyphosphonic acids, in particular aminotris(methylene phosphonic acid), ethylenediaminetetrakis(methylenephosphonic acid) and 1-hydroxyethane-1,1-diphosphonic acid; polymer hydroxy compounds such as dextrin; and polymer (poly)carboxylic acids, in particular the polycarboxylates which can be obtained by oxidation of polysaccharides or dextrins; polymer acrylic acids, methacrylic acids, maleic acids and mixed polymers therefrom, which may also contain small proportions of polymerizable substances without carboxylic acid functionality in polymerized form. The relative molecular mass of the homopolymers of unsaturated carboxylic acids is generally between 3,000 g/mol and 200,000 g/mol, that of the copolymers is generally between 2,000 g/mol and 200,000 g/mol, preferably 30,000 g/mol to 120,000 g/mol, in each case based on free acid. A particularly preferred acrylic acid-maleic acid copolymer has a relative molecular mass of 30,000 g/mol to 100,000 g/mol. Commercial products are, for example, Sokalan® CP 5, CP 10, and PA 30 from BASF. Suitable, albeit less preferred compounds of this class are copolymers of acrylic acid or methacrylic acid with vinyl ethers, such as vinyl methyl ethers, vinyl esters, ethylene, propylene, and styrene, in which the proportion of the acid is at least 50 wt. %. It is also possible to use, as water-soluble organic builder substances, terpolymers which contain two unsaturated acids and/or the salts thereof as monomers and vinyl alcohol and/or an esterified vinyl alcohol or a carbohydrate as the third monomer. The first acid monomer or the salt thereof is derived from a monoethylenically unsaturated $C_3$-$C_8$ carboxylic acid and preferably from a $C_3$-$C_4$ monocarboxylic acid, in particular from (meth)acrylic acid. The second acidic monomer or the salt thereof can be a derivative of a $C_4$-$C_8$ dicarboxylic acid, maleic acid being particularly preferred, and/or a derivative of an allylsulfonic acid which is substituted in the second position with an alkyl or aryl group. Such polymers have a relative molecular mass between 1,000 g/mol and 200,000 g/mol. Further preferred copolymers are those which have acrolein and acrylic acid/acrylic acid salts or vinyl acetate as monomers. The organic builder substances may, in particular for the preparation of liquid agents, be used in the form of aqueous solutions, preferably in the form of 30 to 50 wt. % aqueous solutions. All of said acids are used in the form of their water-soluble salts, in particular their alkali salts.

Organic builder substances of this kind can, if desired, be contained in amounts of up to 40 wt. %, in particular up to 25 wt. %, and preferably of from 1 wt. % to 8 wt. %. Amounts close to the stated upper limit are preferably used in pasty or liquid, in particular water-containing, agents according to the invention.

In particular, alkali silicates, alkali carbonates and alkali phosphates, which can be present in the form of their alkaline, neutral, or acidic sodium or potassium salts, can be used as water-soluble inorganic builder materials. Examples thereof are trisodium phosphate, tetrasodium diphosphate, disodium dihydrogen diphosphate, pentasodium triphosphate, sodium hexametaphosphate, oligomeric trisodium phosphate with degrees of oligomerization of 5 to 1000, in particular 5 to 50, and the corresponding potassium salts or mixtures of sodium and potassium salts. In particular crystalline or amorphous alkali aluminosilicates are used as water-insoluble, water-dispersible inorganic builder materials in amounts of up to 50 wt. %, preferably no greater than 40 wt. %, and in liquid agents in particular in amounts of from 1 wt. % to 5 wt. %. Among these, the crystalline sodium aluminosilicates in washing agent quality, in particular zeolite A, P and optionally X, either alone or in mixtures, for example in the form of a co-crystallizate of the zeolites A and X (Vegobond® AX, a commercial product of Condea Augusta S.p.A.), are preferred. Amounts close to the stated upper limit are preferably used in solid, particulate agents. Suitable aluminosilicates have in particular no particles having a particle size greater than 30 μm and preferably consist of at least 80 wt. % of particles having a size smaller than 10 μm. The calcium binding capacity of said aluminosilicates is in the range of 100 to 200 mg CaO per gram.

Suitable substitutes or partial substitutes for the above-mentioned aluminosilicate are crystalline alkali silicates, which can be present alone or in a mixture with amorphous silicates. The alkali silicates that can be used in the agents according to the invention as builders preferably have a molar ratio of alkali oxide to $SiO_2$ of less than 0.95, in particular of from 1:1.1 to 1:12, and may be present in amorphous or crystalline form. Preferred alkali silicates are sodium silicates, in particular amorphous sodium silicates, having a molar ratio of $Na_2O:SiO_2$ of from 1:2 to 1:2.8. The crystalline silicates used, which can be present alone or in a mixture with amorphous silicates, are preferably crystalline phyllosilicates of the general formula $Na_2Si_xO_{2x+1}\cdot y\ H_2O$, in which x, the so-called module, is a number from 1.9 to 22, in particular 1.9 to 4, and y is a number from 0 to 33, and preferred values for x are 2, 3 or 4. Preferred crystalline phyllosilicates are those in which x assumes the values 2 or 3 in the mentioned general formula. Both β- and δ-sodium disilicates ($Na_2Si_2O_5\cdot y\ H_2O$) are particularly preferred. Practically water-free crystalline alkali silicates of the above general formula, in which x means a number from 1.9 to 2.1, which are produced from amorphous alkali silicates, may also be used in agents according to the invention. In another preferred embodiment of agents according to the invention, a crystalline sodium phyllosilicate having a module of 2 to 3 is used. Crystalline sodium silicates having a module in the range of from 1.9 to 3.5 are used in a further preferred embodiment of agents according to the invention. Crystalline phyllosilicates are commercially available, e.g., Na—SKS-1 ($Na_2Si_{22}O_{45}\cdot x\ H_2O$, kenyaite), Na—SKS-2 ($Na_2Si_{14}O_{29}\cdot x\ H_2O$, magadiite), Na—SKS-3 ($Na_2Si_8O_{17}\cdot x\ H_2O$) or Na—SKS-4 ($Na_2Si_4O_9\cdot x\ H_2O$, macatite). Of these, Na—SKS-5 (α-$Na_2Si_2O_5$), Na—SKS-7 (β-$Na_2Si_2O_5$, natrosilite), Na—SKS-9 ($NaHSi_2O_5\cdot 3H_2O$), Na—SKS-10 ($NaHSi_2O_5\cdot 3H_2O$, Kanemite), Na—SKS-11 (t-$Na_2Si_2O_5$) and Na—SKS-13 ($NaHSi_2O_5$), but in particular Na—SKS-6 (δ-$Na_2Si_2O_5$), are particularly suitable. In a preferred embodiment of agents according to the invention, a granular compound made of crystalline phyllosilicate and citrate, crystalline phyllosilicate and the above-described (co)polymeric polycarboxylic acid, or alkali silicate and alkali carbonate is used, as is commercially available under the name Nabion® 15, for example. Builder substances are normally present in amounts of up to 75 wt. %, and in particular of 5 wt. % to 50 wt. %.

Suitable peroxygen compounds suitable for use in detergents include, in particular, organic peroxy acids or peracid salts of organic acids, such as phthalimidopercaproic acid, perbenzoic acid, or salts of diperdodecanoic diacid, hydrogen peroxide and inorganic salts giving off hydrogen peroxide under the washing conditions, which include perborate, percarbonate, persilicate, and/or persulfates such as caroate. If solid peroxygen compounds are intended to be used, these may be used in the form of powders or granules, which may also be coated in a manner known in principle. If an agent according to the invention contains peroxygen compounds, these are present in amounts of preferably up to 50 wt. %, in particular from 5 wt. % to 30 wt. %. The addition of small amounts of known bleaching agent stabilizers such as phosphonates, borates or metaborates, metasilicates, and magnesium salts such as magnesium sulfate may be expedient.

Compounds which, under perhydrolysis conditions, result in aliphatic peroxocarboxylic acids having preferably 1 to 10 C atoms, in particular 2 to 4 C atoms, and/or optionally substituted perbenzoic acid, may be used as bleach activators. Substances that have O acyl and/or N acyl groups of the stated number of C atoms and/or optionally substituted benzoyl groups are suitable. Preferred are polyacylated alkylene diamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoyl succinimide (NOSI), acylated phenolsulfonates, in particular n-nonanoyl- or isononanoyloxybenzenesulfonate (n- or iso-NOBS), carboxylic acid anhydrides, in particular phthalic acid anhydride, acylated polyhydric alcohols, in particular triacetin, ethylene glycol diacetate, 2,5-diacetoxy-2,5-dihydrofuran and enol ester, and acetylated sorbitol and mannitol or the mixtures thereof (SORMAN), acylated sugar derivatives, in particular pentaacetyl glucose (PAG), pentaacetyl fructose, tetraacetyl xylose and octaacetyl lactose, and acetylated, optionally N-alkylated glucamine and gluconolactone, and/or N-acylated lactams, for example N-benzoylcaprolactam. The hydrophilically substituted acyl acetals and the acyl lactams are likewise preferably used. Combinations of conventional bleach activators can also be used. Such bleach activators can, in particular in the presence of the above-mentioned hydrogen peroxide-yielding bleaching agents, be present in the customary quantity range, preferably in amounts of 0.5 wt. % to 10 wt. %, in particular 1 wt. % to 8 wt. %, based on the total agent, but are preferably entirely absent when percarboxylic acid is used as the sole bleaching agent.

In addition to or instead of the conventional bleach activators, sulfonimines and/or bleach-enhancing transition metal salts or transition metal complexes may also be contained as what are referred to as bleach catalysts.

Enzymes from the class of amylases, proteases, lipases, cutinases, pullulanases, hemicellulases, cellulases, oxidases, laccases and peroxidases, and mixtures thereof, are suitable as enzymes that can be used in the agents. Enzymatic active ingredients obtained from fungi or bacteria, such as *Bacillus subtilis, Bacillus licheniformis, Bacillus lentus, Streptomyces griseus, Humicola lanuginosa, Humicola insolens, Pseudomonas pseudoalcaligenes, Pseudomonas cepacia* or *Coprinus cinereus* are particularly suitable. The enzymes can be adsorbed on carrier substances and/or embedded in coating substances to protect the enzymes from premature inactivation. They are contained in the washing or cleaning agents according to the invention preferably in amounts of up to 5 wt. %, in particular from 0.2 wt. % to 4 wt. %. If the agent according to the invention contains protease, it preferably has a proteolytic activity in the range of approximately 100 PE/g to approximately 10,000 PE/g, in particular 300 PE/g to 8,000 PE/g. If a plurality of enzymes are to be used in the agent according to the invention, this can be carried out by incorporating the two or more separate enzymes or enzymes that have been separately manufactured in a known manner, or by two or more enzymes collectively manufactured in a granulate.

The organic solvents that can be used in the detergents in addition to water, in particular when the agents are present in liquid or pasty form, include alcohols having 1 to 4 C atoms, in particular methanol, ethanol, isopropanol and tert-butanol, diols having 2 to 4 C atoms, in particular ethylene glycol and propylene glycol, and mixtures thereof, and the ethers that can be derived from the mentioned compound classes. Water-miscible solvents of this kind are present in the agents according to the invention preferably in amounts of no greater than 30 wt. %, in particular of 6 wt. % to 20 wt. %.

In order to set a desired pH that does not result automatically from mixing the other components, the agents according to the invention can contain acids that are compatible with the system and environment, in particular citric acid, acetic acid, tartaric acid, malic acid, lactic acid, glycolic acid, succinic acid, glutaric acid, and/or adipic acid, but also mineral acids, in particular sulfuric acid, or bases, in particular ammonium or alkali hydroxides. pH regulators of this kind are contained in the agents according to the invention in amounts of preferably no greater than 20 wt. %, in particular of 1.2 wt. % to 17 wt. %.

The function of graying inhibitors is to keep the dirt that is removed from the textile fibers suspended in the liquor. Water-soluble colloids, which are usually organic, are suitable for this purpose, for example starch, sizing material, gelatin, salts of ethercarboxylic acids or ethersulfonic acids of starch or of cellulose, or salts of acidic sulfuric acid esters of cellulose or of starch. Water-soluble polyamides containing acid groups are also suitable for this purpose. Starch derivatives other than those mentioned above may also be used, for example aldehyde starches. Cellulose ethers, such as carboxymethylcellulose (Na salt), methylcellulose, hydroxyalkylcellulose, and mixed ethers, such as methylhydroxyethylcellulose, methylhydroxypropylcellulose, methylcarboxymethylcellulose and mixtures thereof, are used, for example, in amounts of 0.1 to 5 wt. %, based on the agents.

Washing agents may contain, for example, derivatives of diaminostilbene disulfonic acid or the alkali metal salts thereof as optical brighteners, although they are preferably free of optical brighteners when used as color washing agents. Salts of 4,4'-bis(2-anilino-4-morpholino-1,3,5-triazinyl-6-amino)stilbene-2,2'-disulfonic acid or compounds having a similar structure which, instead of the morpholino group, have a diethanolamino group, a methylamino group, an anilino group or a 2-methoxyethylamino group are suitable, for example. Furthermore, brighteners of the substituted diphenylstyryl type may be present, for example the alkali salts of 4,4'-bis(2-sulfostyryl)diphenyl, 4,4'-bis(4-chloro-3-sulfostyryl)diphenyl, or 4-(4-chlorostyryl)-4'-(2-sulfostyryl)diphenyl. Mixtures of the aforementioned optical brighteners may also be used.

It may be advantageous to add conventional suds suppressors to the agents, in particular in use in mechanical processes. Soaps of natural or synthetic origin having a high proportion of $C_{18}$-$C_{24}$ fatty acids are suitable as suds suppressors, for example. Suitable non-surfactant suds suppressors are, for example, organopolysiloxanes and mixtures thereof with microfine, optionally silanated silicic acid and paraffins, waxes, microcrystalline waxes, and mixtures thereof with silanated silicic acid or bis fatty acid alkylenediamides. Mixtures of various suds suppressors are also advantageously used, for example those consisting of silicones, paraffins, or waxes. The suds suppressors, in particular silicone- and/or paraffin-containing suds suppressors, are preferably bound to a granular carrier substance that is soluble or dispersible in water. Mixtures of paraffins and bistearylethylenediamide are particularly preferred.

The preparation of solid agents presents no difficulties and can be carried out in a known manner, for example by spray-drying or granulation, in which enzymes and possibly other thermally sensitive ingredients, such as bleaching agents, are optionally added separately later. For the preparation of agents having an increased bulk density, in particular in the range of 650 g/L to 950 g/L, a method having an extrusion step is preferred.

To prepare agents in tablet form, which can be single-phase or multiphase, single-color or multi-color and in particular can be composed of one layer or of multiple layers, in particular of two layers, all components—optionally one layer each—are preferably mixed with one another in a mixer, and the mixture is compressed using conventional tablet presses, such as eccentric presses or rotary presses, using pressures in the range of approximately 50 to 100 kN, preferably 60 to 70 kN. In the case of multilayer tablets in particular, it can be advantageous if at least one layer is pre-pressed. This is preferably carried out at pressures of between 5 and 20 kN, in particular at 10 to 15 kN. This readily yields break-resistant tablets that nonetheless dissolve sufficiently quickly under usage conditions, normally with breaking and flexural strengths of 100 to 200 N, but preferably above 150 N. A tablet thus produced preferably has a weight of 10 g to 50 g, and in particular of 15 g to 40 g. The tablets can have any physical shape, and they can be round, oval, or angular, wherein intermediate shapes are also possible. Corners and edges are advantageously rounded. Round tablets preferably have a diameter of 30 mm to 40 mm. In particular, the size of angular or cuboid tablets, which are predominantly introduced via the dosing device of the washing machine, is dependent on the geometry and the volume of this dosing device. By way of example, preferred embodiments have a base surface of (20 to 30 mm)×(34 to 40 mm), and in particular of 26×36 mm or of 24×38 mm.

Liquid or pasty agents in the form of solutions containing conventional solvents are usually prepared by simple mixing of the ingredients, which can be put into an automatic mixer in bulk or as a solution.

EXAMPLES

Example 1: Preparation of a Polyester-Based Comb Polymer (P1) Based on 1-Vinylimidazole a) Preparation of an Unsaturated Polyester (PE1)

11.6 g of maleic acid, 6.3 g of ethylene glycol and 48.5 mg of p-toluenesulfonic acid in 100 ml of toluene were stirred under reflux for 5 hours and the resulting water of reaction was distilled off. After cooling to room temperature, the supernatant toluene was decanted off and the remainder of the solvent was removed at 40° C. under reduced pressure.

Yield: 14.6 g (82% of theory)

GPC in water: $M_n$ 700 g/mol, $M_w$ 1000 g/mol b) Preparation of an Amino-Functionalized Prepolymer (PP1)

671 mg of 2,2'-azobis[2-methylpropionamidine] dihydrochloride were added to 1.57 g of cysteamine and 19 g of 1-vinylimidazole in 60 ml of water. The mixture was degassed by introducing nitrogen. It was stirred at 75° C. overnight. After cooling to room temperature, it was poured into 500 ml of tetrahydrofuran (THF), thereby precipitating the product. The solvent was decanted off and the resulting prepolymer was dried at 40° C. in a vacuum drying oven overnight.

Yield: 11.7 g (54% of theory)

GPC in water: $M_n$ 650 g/mol, $M_w$ 3000 g/mol c) Preparation of the Polyester-Based Comb Polymer (P1)

A solution of 0.5 g of the unsaturated polyester PE1 from Example 1a) and 5.28 g of the prepolymer PP1 from Example 1 b) in 30 ml of dry dimethyl sulfoxide (DMSO) was stirred at 100° C. for 1 week. It was then cooled to room temperature and the product was precipitated in 300 ml of diethyl ether. The resulting polymer was dried in a vacuum drying oven.

Yield: 7.8 g

GPC in water: $M_n$ 700 g/mol, $M_w$: 3500 g/mol

Example 2: Preparation of a Polyester-Based Comb Polymer (P2) Based on 1-Vinylimidazole and N-Vinylpyrrolidone a) Preparation of an Amino-Functionalized Prepolymer (PP2)

671 mg of 2,2'-azobis[2-methylpropionamidine] dihydrochloride were added to 1.57 g of cysteamine, 11.34 g of N-vinylpyrrolidone and 9.5 g of 1-vinylimidazole in 60 ml of water. The mixture was degassed by introducing nitrogen. It was stirred at 75° C. overnight. It was then cooled to room temperature and precipitated in 1000 ml of THF. The solvent was decanted off and the resulting polymer was dried at 40° C. in a vacuum drying oven for 60 hours.

Yield: 18.3 g (82% of theory)

GPC in water: $M_n$ 2000 g/mol, $M_w$ 14000 g/mol b) Preparation of the Polyester-Based Comb Polymer (P2)

A solution of 0.5 g of the unsaturated polyester PE1 from Example 1a) and 5.28 g of the prepolymer PP2 from Example 2a) in 30 ml of dry DMSO was stirred at 100° C. for 1 week. It was then cooled to room temperature and the product was precipitated in 300 ml of diethyl ether. The resulting polymer was dried in a vacuum drying oven.

Yield: 8.0 g

GPC in water: $M_n$ 2000 g/mol, $M_w$ 16000 g/mol

Example 3: Dye Inhibition

The color releasers (colored textile which easily releases dye) given in the following table were washed in the presence of white cotton acceptor fabric (6 cm×16 cm; WFK 11 A) and polyamide acceptor fabric (FA Swissatest (406)) for 30 minutes at 60° C. Thereafter, the coloration of the cotton or polyamide textile was determined by spectrophotometry and evaluated according to ISO 105 A04 (SSR notes on a scale of 1 to 5; 1=strong coloration, 5=no coloration). Washing liquors were used with a color-transfer-inhibitor-free water-containing liquid detergent (F; concentration 3.5 g/l) or with equal amounts of otherwise identically composed agents to which one of polymers P1 or P2 prepared in Examples 1 and 2 had been added while reducing the amount of water. The following SSR notes were obtained (mean value from 2-fold determination in each case):

TABLE 1

Results of the dye inhibition inhibition

| Acceptor | Color releaser | F | F + P1 | F + P 2 |
|---|---|---|---|---|
| Cotton | Direct Red 83:1, EMPA | 3.0 | 4.9 | 4.9 |
| Cotton | Direct Black 22, EMPA | 3.7 | 3.8 | 4.3 |
| Polyamide | Direct Black 22, EMPA | 3.6 | 4.1 | 4.6 |
| Polyamide | Direct Orange 39; EMPA | 2.6 | 3.3 | 3.4 |

It can be seen that, in comparison with the detergent not comprising the addition of the polyester-based comb polymers essential to the invention, the white textiles became colored to a lesser degree when washing with polyester-based comb polymer additive.

What is claimed is:

1. A detergent composition, comprising a surfactant and a dye transfer inhibitor in a dye transfer inhibiting amount, wherein the dye transfer inhibitor comprises a polyester-based comb polymer, obtainable by aza-Michael addition of S-substituted primary aminothiols to oligoesters of mono-ethylenically or diethylenically unsaturated dicarboxylic acids and diols, and wherein the polyester-based comb polymer has the general formula

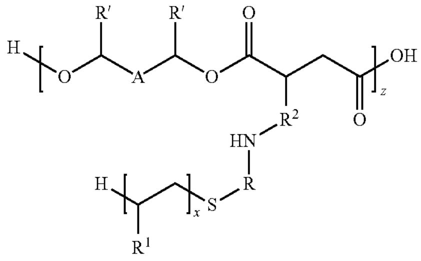

wherein

R' represents H or a methyl group, $R^1$ represents a heterocycle, $R^2$ represent a $C_1$-$C_{12}$ alkyl group, R represents a straight-chain or branched hydrocarbon group having 2 to 12 C atoms or $—(CR^3R^4—CR^3RO)_y—CR^3R^4—CR^3R^4—$, $R^3$ and $R^4$ represent, independently of one another, H or a $C_1$-$C_3$ alkyl group, A represents $—(CH_2)_m—$, $—(CHR_2)_m—$ or $—((CR_5R_6)_p—O—(CR_5R_6)_q)_n—$, $R^5$ and $R^6$ represent H or a $C_1$-$C_3$ alkyl group, m represents a number from 0 to 10, n represents a number from 0 to 30, p and q represent, independently of one another, numbers from 1 to 3, x represents a number from 0 to 30, y represents a number from 1-12, and z represents a number from 1 to 30.

2. The detergent composition according to claim 1, wherein the polyester-based comb polymer is in amounts of 0.01 wt. % to 5 wt. %.

3. The detergent composition according to claim 1, wherein the dye transfer inhibitor further comprises a polymer selected from the group consisting of vinylpyrrolidone, vinylimidazole, vinylpyridine N-oxide, and the copolymers thereof.

4. A method for washing white or colored textiles comprising a step of contacting the textiles with an aqueous solution of the detergent composition according to claim 1.

5. The detergent composition according to claim 4, wherein the heterocyclic substituent $R^1$ is selected from the group consisting of imidazole, pyrrolidone and mixtures thereof.

6. The method according to claim 4, wherein the aqueous solution comprises from 0.0003 g/l to 0.16 g/l of the polyester-based comb polymer.

* * * * *